(12) United States Patent
Minnie

(10) Patent No.: US 7,971,559 B2
(45) Date of Patent: Jul. 5, 2011

(54) METHOD FOR REMOVING SALT DEPOSITS IN REFORMER WASTE HEAT BOILERS

(75) Inventor: Rudolph Ockert Minnie, Mosselbay, CA (US)

(73) Assignee: The Petroleum Oil & Gas Corporation of South Africa (Pty)Ltd, Cape Town (ZA)

( * ) Notice: Subject to any disclaimer, the term of this patent is extended or adjusted under 35 U.S.C. 154(b) by 846 days.

(21) Appl. No.: 11/817,259

(22) PCT Filed: Feb. 24, 2006

(86) PCT No.: PCT/ZA2006/000030
§ 371 (c)(1),
(2), (4) Date: Jan. 11, 2008

(87) PCT Pub. No.: WO2006/091987
PCT Pub. Date: Aug. 31, 2006

(65) Prior Publication Data
US 2008/0264256 A1    Oct. 30, 2008

(30) Foreign Application Priority Data

Feb. 28, 2005  (ZA) .................................. 2005/1707

(51) Int. Cl.
*F22B 37/48* (2006.01)
(52) U.S. Cl. ............................ 122/7 R; 122/379; 95/290
(58) Field of Classification Search .................. 122/7 R, 122/7 C, 379, 390, 392; 95/290
See application file for complete search history.

(56) References Cited

U.S. PATENT DOCUMENTS

| | | | |
|---|---|---|---|
| 3,759,678 A | | 9/1973 | Chamberland et al. |
| 4,276,153 A | * | 6/1981 | Yoshitake et al. .......... 208/48 Q |
| 4,296,085 A | * | 10/1981 | Banquy .......................... 423/359 |
| 4,542,114 A | * | 9/1985 | Hegarty .......................... 502/39 |
| 4,793,976 A | * | 12/1988 | Lee ............................... 422/190 |

* cited by examiner

*Primary Examiner* — Gregory A Wilson
(74) *Attorney, Agent, or Firm* — Hahn & Moodley LLP; Vani Moodley, Esq.

(57) ABSTRACT

The invention provides a method for removing salt deposits from waste heat boilers in a reformer train. The method includes the steps of producing a fluid stream which includes steam from a reformer and flowing to waste heat boilers, and controlling the temperature and pressure of the fluid stream to reach a temperature in the waste heat boilers of below or equal to the salt deposit saturation point of the steam in the fluid stream.

7 Claims, No Drawings

METHOD FOR REMOVING SALT DEPOSITS IN REFORMER WASTE HEAT BOILERS

TECHNICAL FIELD OF THE INVENTION

This invention relates to a method for removing salt deposits in reformer waste heat boilers.

BACKGROUND TO THE INVENTION

Excess heat from synthesis gas (syngas) exiting from a reformer is removed by waste heat boilers. Sodium sublimate at 823° C., and subsequently leaches from the heat resistant, refractory, lining bricks of the reformer. The sodium cause sodium fouling, in the form of sodium carbonate deposits in the waste heat boilers. Sodium carbonate could be used as a heat insulator, hence its deposit in the waste heat boiler tubes lowers the heat removing capacity. In order to remove the sodium carbonate from the waste heat boilers, in accordance with prior art methods, the whole reformer train needs to be shut down for about six days. During the shut down, the reformer train need to be cooled to ~40° C. to allow personnel to enter the waste heat boilers, who use brushes to get rid of sodium carbonate. It is an objective of this invention to minimise the shut down period of the reformer train while removing the sodium carbonate from the waste heat boilers. It is a further objective of this invention to avoid re-hydration of the refractory bricks during shut down to avoid weakening of the refractory bricks and an extended dry out procedure of the bricks before start-up of the reformer train. This had been a problem during prior art methods of sodium removal.

GENERAL DESCRIPTION OF THE INVENTION

According to a first aspect of the invention there is provided a method for removing salt deposits from waste heat boilers in a reformer train, which method includes the steps of:

producing a fluid stream which includes steam from a reformer; and controlling the temperature and pressure of the fluid stream to reach a temperature in the waste heat boilers of below or equal to the salt deposit saturation point of the steam in the fluid stream.

The temperature control for the reforming process is normally a gas/oil fired heater upstream of the autothermal reformer or a steam methane reformer in the case of Combined reforming or Parallel reforming. These furnaces are used to preheat natural gas, steam and oxygen for the normal reforming process or nitrogen for the commissioning phase. Therefore, the inlet temperature at the reformer and subsequently at the waste heat boilers can be controlled from as low as 40° C. up to 650° C.

With the salt saturation point of steam is meant the temperature and pressure point of steam at which the salt is entrained or carried in the steam of the fluid stream.

The preferred temperature is the saturation temperature of the steam/nitrogen mixture which is normally between 200 and 225° C. at a process pressure of 600-900 kPa(g).

The composition of the salt will depend on the type of refractory bricks of the reformer lining. Typically the salt may be sodium carbonate.

The fluid stream from the reformers entering the waste heat boilers may be at a temperature above the salt saturation point of steam and allowed to cool down in the waste heat boilers to a temperature at or below the saturation point. The entire syngas path e.g. from the inlet of the Steam methane reformer or the inlet of the autothermal reformer can be cooled down by slowly decreasing the heat input into the furnace/steam methane reformer leading to subsequent cooling of the steam/nitrogen to below the saturation temperature of the steam/nitrogen mixture at the inlet of the waste heat boilers.

The fluid stream from the reformers may include nitrogen. It will be appreciated that the partial pressure of the steam in a mixture of steam and nitrogen needs to be taken into consideration to determine the salt saturation point of the steam.

The main objective of the steam out exercise is to cool down the Waste heat boilers (WHB) tube side temperature's to below the saturation point of steam.

| SYSTEM PRESSURE | STEAM SATURATION TEMPERATURE |
| --- | --- |
| 4000 kPa | 250.3° C. |
| 2250 kPa | 218.4° C. Target System Press and Temp |
| 2100 kPa | 214.9° C. |
| 2000 kPa | 212.4° C. |
| 1000 kPa | 179.9° C. |
| 700 kPa | 165.0° C. |
| 600 kPa | 158.8° C. |

Therefore it is preferable to aim for a WHB outlet temperature of <218° C. and a system pressure of 2250 kPa at battery limit.

It is preferable that the salt saturation point of the fluid stream is reached in the part of the waste heat boiler where the salt is deposited, normally the tube part of the waste heat boiler and not before the tube part or inlet chamber of the waste heat boiler. It will be appreciated that this measure ensures that the refractory lining bricks of in the reformer train does not become rehydrated. If the bricks become rehydrated, a time consuming dry out procedure needs to be performed before start-up of the reformer train.

The preferred sodium carbonate saturation point temperature and pressure of the fluid stream may be between a pressure of 500 Kpa and 4000 Kpa at a temperature of between 150° C. and 250° C. with a nitrogen percentage of between 1-30%, typically 15%.

The conductivity of the water in the fluid stream exiting the waste heat boiler may be monitored to determine when the salt saturation point of the fluid stream has been reached and when sufficient quantities of salt has been removed from the waste heat boiler.

Once the salt has been sufficiently removed, the start-up of the reformer train may commence.

In the event that the refractory bricks become hydrated, the dry-out of hydrated refractory is accomplished by using only nitrogen gas as a water removal medium.

Wet cast refractory should be dried at 120° C. to remove free water. A guideline is a minimum of 1 hour per 1" of refractory, depending on the drying medium. Despite the large quantities of dry (dew point minus 80° C.) nitrogen available, it is recommended that a holding time of 6 hours at this temperature be used (with 20,000-25,000 nm3/h nitrogen).

Both front and rear faces of the refractory in the WHB's should be held at this temperature. Therefore, while the autothermal reformer outlet temperature should be held at 120° C. and the steam drum pressure must be 100 kPa(g) or greater.

The presence of hydrates in the refractory causes variation in volumetric and strength properties, which may affect the formation of the above mentioned gap. Therefore, hydrate removal is necessary by holding the refractory at temperatures above that which is required for the existence of the stable hydrates of calcium and alumina.

For refractories in ambient or nitrogen atmospheres, the minimum temperature for this is 350° C. In order to achieve this at both front and rear surfaces of the WHB's, it is necessary to hold the gas side temperature at 450° C. with the steam drum pressure at 40 bar for a further 6 hours.

Re-hydration and the Introduction of Steam. The formation of water in the refractory must be avoided. However, condensation of water in refractory takes place at 50° C. above the dew point of the gas due adsorption in capillaries. Therefore, the coldest temperature at which steam should be introduced is 50° C. above the gas/steam mixture dew point temperature. For the process (hot) side, this is 250° C. for most practical purposes, while the steam drum should be at a minimum of 4000 kPa(g) to maintain the cold side at the same temperature.

In order to minimise the hydrate, and until applicable data can be found, it is recommended to raise the temperature at which steam is brought in, or taken out, to 450° C. at the autothermal reformer outlet.

Guidelines for Start-up

While the unit is still cold, fill the steam drum with boiler feed water and start heating the drum with steam. Open the steam supply gradually and heat the boiler feed water to 120° C. (@ 100 kPa(g) over 2.5-3 hrs (i.e. <50° C./h).

While the steam drum is heating up, commence heating of the reformer using 20,000-25,000 nm3/h nitrogen to 120° C., ensuring heating at <50° C.

With the autothermal outlet at 120° C. and the steam drum at 100 kPa(g) hold for 6 hrs to dry the refractory (Methane steam reformer outlet 150° C.). This step is necessary to remove free water from the refractory.

Increase the temperature at 50° C./h to reach a temperature of 450° C. at the autothermal reformer outlet. Gradually increase the pressure in the steam drum to 4000 kPa(g).

Maintain these conditions for a further 6 hrs.

DETAILED DESCRIPTION OF THE INVENTION

The invention is now described by way of example.

A typical reformer train with a capacity of 1000-7000 MTPD (metric ton per day), expressed in methanol equivalent, includes a primary and/or secondary reformer. During normal operation the synthesis gas formed in the reformers will exit the secondary reformer at a pressure of about 2000-10000 Kpa and a temperature of about 900-1100° C. In the waste heat boilers the synthesis gas is cooled to about 300-550° C.

A typical method for removing sodium carbonate salt deposits from the waste heat boilers, in accordance with the invention, includes the steps of producing a fluid stream which includes nitrogen and steam from the reformers and controlling the temperature and pressure of the fluid stream to reach a temperature in the waste heat boilers of below or equal to 218° C. at an absolute pressure of 2250 kPa, the sodium carbonate salt deposit saturation point of the steam in the fluid stream. Nitrogen gas ensures that the minimum turn down rates are not violated.

The fluid stream is produced by shutting down the primary and secondary reformers except for the steam flow, 40 ton per hour for the primary reformer and 30 ton per hour for the secondary reformer. The steam is allowed to cool. A 14000 nm³/h high pressure flow of nitrogen is added to the secondary reformer once it reaches a temperature of 600° C. The reformer train pressure is then set to 2250 kPa. The process steam temperature and the secondary reformer outlet is maintained above 230° C. The waste heat boiler temperature is then allowed to cool to below 215° C. for about 4 hours.

The conductivity of water in the fluid stream exiting the waste heat boiler may be monitored to determine when the salt saturation point of the fluid stream has been reached and when sufficient quantities of salt has been removed from the waste heat boiler. Normally a conductivity of more than 15 µS/cm indicates that the saturation point is being reached. A conductivity of 1346 µS/cm indicates that 2573 mg/l sodium carbonate is present in the steam.

Once the conductivity drops to below, 150 µS/cm, after about 4 hours the salt has been sufficiently removed and the start-up of the reformer train can commence.

It shall be understood that the example is provided for illustrating the invention further and to assist a person skilled in the art with understanding the invention and are not meant to be construed as unduly limiting the reasonable scope of the invention.

The invention claimed is:

1. A method for removing salt deposits from waste heat boilers in a reformer train, which method comprises the steps of:
    shutting down each reformer in the reformer train except for the steam flow to producing a fluid stream which includes steam from a reformer and flowing to waste heat boilers; and
    controlling the temperature and pressure of the fluid stream to reach a temperature in the waste heat boilers of below or equal to the salt deposit saturation point of the steam in the fluid stream.

2. A method as claimed in claim 1, wherein the fluid stream from the reformer also includes nitrogen.

3. A method as claimed in claim 2, wherein the fluid stream from the reformers enters the waste heat boilers at a temperature above the salt saturation point of steam an is allowed to cool down in the waste heat boilers to a temperature at or blow the saturation point.

4. A method as claimed in claim 1, wherein the fluid stream from the reformers enters the waste heat boilers at a temperature above the salt saturation point of steam and is allowed to cool down in the waste heat boilers to a temperature at or below the saturation point.

5. A method as claimed in claim 4, wherein the salt saturation point of the fluid stream is reached in the part of the waste heat boiler where the salt is deposited.

6. A method as claimed in claim 1, wherein the salt deposit comprises sodium carbonate and a sodium carbonate saturation point temperature and pressure of the fluid stream is selected to be between a pressure of 500 Kpa and 4000 Kpa at a temperature of between 150° C. and 250°C. with a nitrogen percentage of between 1-30%.

7. A method as claimed in claim 1, wherein the conductivity of the water in the fluid stream exiting the waste heat boiler is monitored to determine when the salt saturation point of the fluid stream has been reached and when sufficient quantities of salt has been removed from the waste heat boiler.

* * * * *